(12) United States Patent
Calderini et al.

(10) Patent No.: US 6,347,536 B1
(45) Date of Patent: Feb. 19, 2002

(54) PROCESS AND DEVICE FOR MANUFACTURING NETWORKS OF MICROLENSES

(75) Inventors: Pierre V. Calderini, Loing; Theirry L. A. Dannoux, Avon; Jean-Pierre Themont, Loing, all of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/367,711

(22) PCT Filed: Feb. 26, 1997

(86) PCT No.: PCT/US97/00952

§ 371 Date: Nov. 22, 1999

§ 102(e) Date: Nov. 22, 1999

(87) PCT Pub. No.: WO98/38137

PCT Pub. Date: Sep. 3, 1998

(51) Int. Cl.[7] .............................................. C03B 23/02
(52) U.S. Cl. .................. 65/106; 264/1.1; 264/297.4; 425/234; 425/338; 425/405.1
(58) Field of Search ................... 65/102, 106; 264/1.1, 264/297.4; 425/234, 338, 405.1

(56) References Cited

U.S. PATENT DOCUMENTS 1,653,524 A * 12/1927 Webb ......................... 264/107
5,380,349 A * 1/1995 Taniguchi et al. ............ 65/286
6,030,829 A * 2/2000 Dannoux et al. ......... 435/288.3

FOREIGN PATENT DOCUMENTS

| DE | 115 810 | * | 12/1900 |
| EP | 0 691 551 | * | 1/1996 |
| FR | 2 731 647 | * | 9/1996 |
| GB | 2 264 890 | * | 9/1993 |

OTHER PUBLICATIONS

Patent Abstract of Japan 4–175228, Oct. 1992.*
Patent Abstract of Japan, JP 1–176240, Jul. 1989.*
Patent Abstract of Japan, JP 6–2790378, Oct. 1994.*
Patent Abstract of Japan, JP 1–133951, May 1989.*

* cited by examiner

Primary Examiner—Sean Vincent
(74) Attorney, Agent, or Firm—Milton M. Peterson

(57) ABSTRACT

The device includes a housing, a means for heating the housing, and a means for supporting, in the housing, at least one group composed of plates of malleable material under pressure at the temperature established in the housing. Moreover, the group includes generally flat molds and each mold includes at least one non malleable pitted surface under pressure at said temperature. The molds are inserted between the plates. Means are envisaged to apply a roughly uniform pressure, oriented perpendicularly to the surface of the plates to the entire group. This pressure is suitable for causing the production of convex surfaces of microlenses on the sides of the plates, which are opposite said pitted surfaces of the molds.

17 Claims, 2 Drawing Sheets

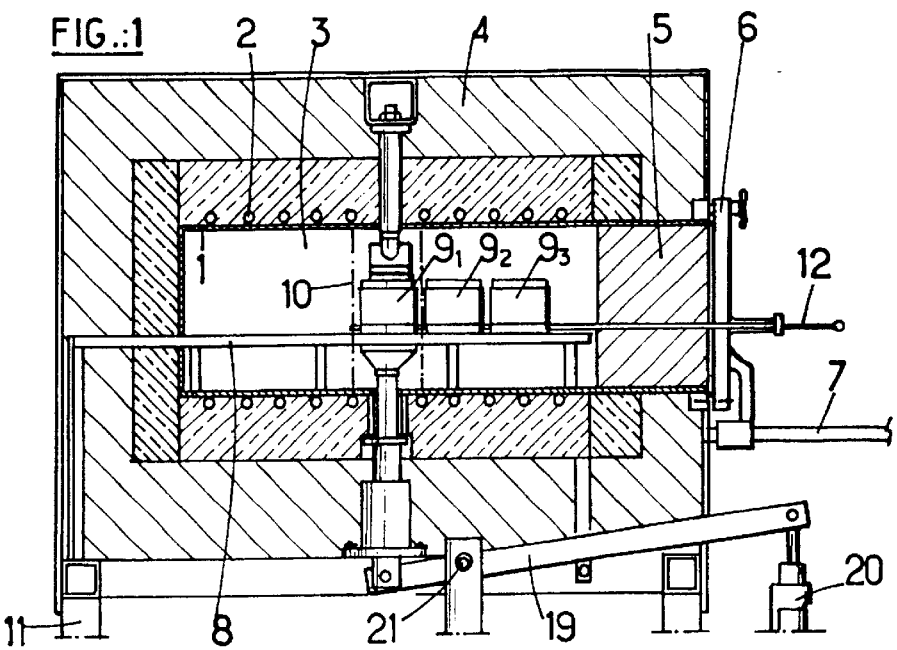
FIG.:1
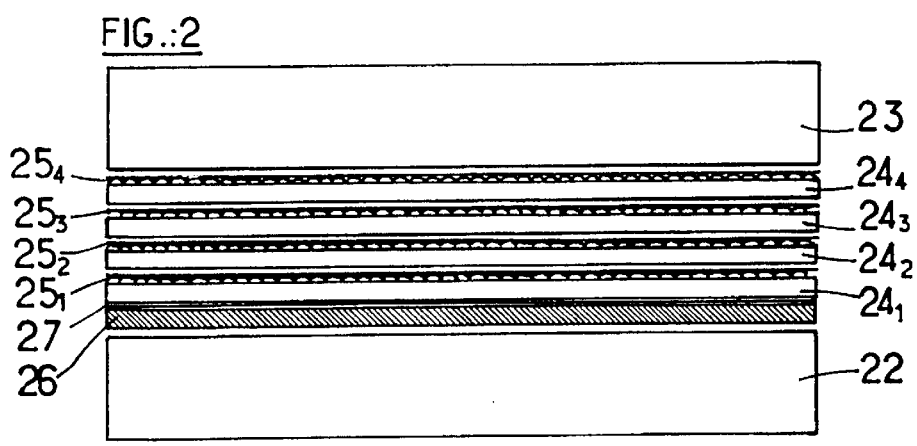
FIG.:2
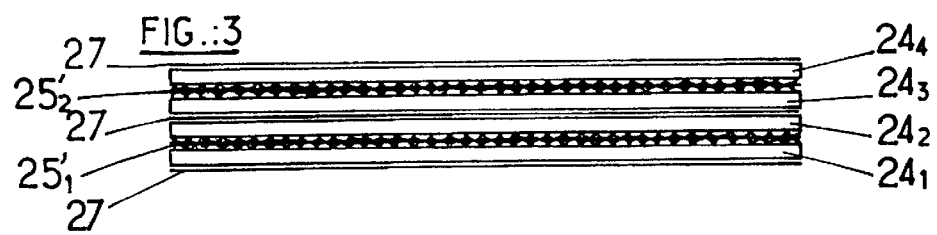
FIG.:3
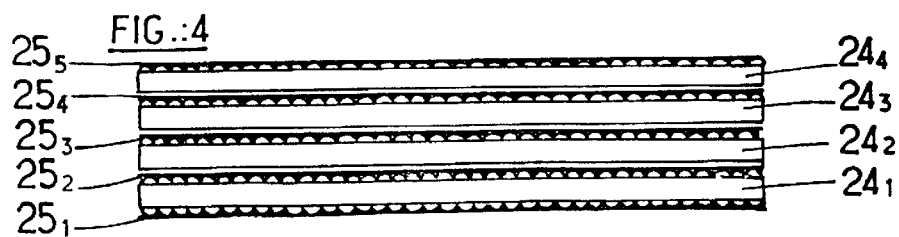
FIG.:4

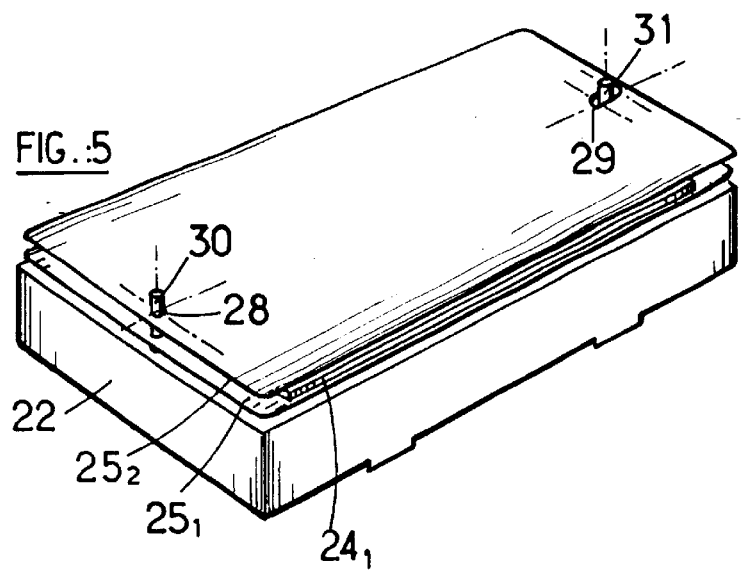
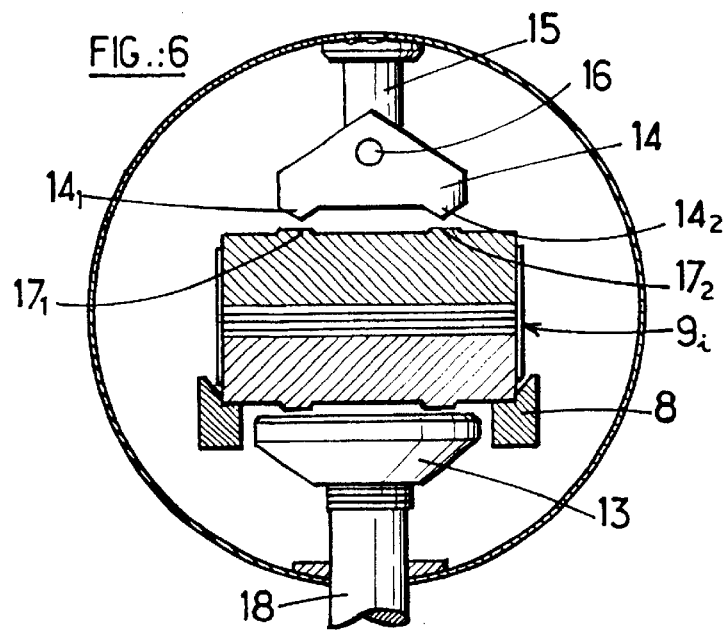
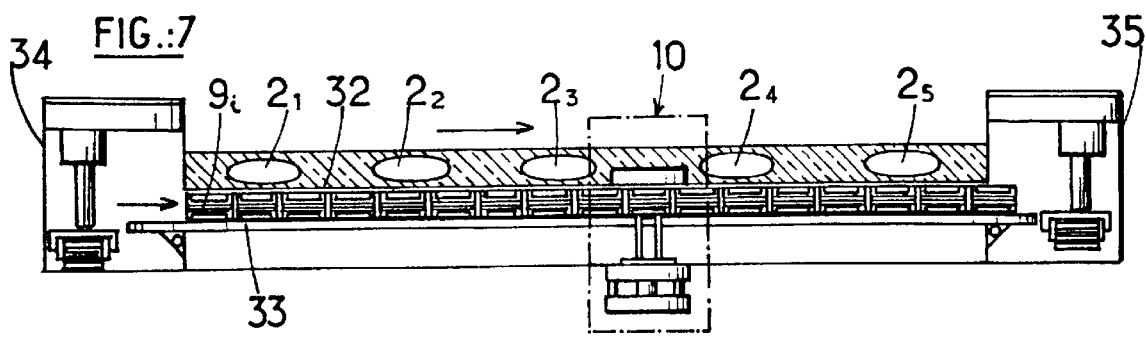

PROCESS AND DEVICE FOR MANUFACTURING NETWORKS OF MICROLENSES

The present invention pertains to a process and device for manufacturing networks of microlenses and, especially, to a process in which a plate of malleable material is pressed against a grooved nonmalleable surface of a consistent network of pits in which at least the openings correspond to the contours of the convex parts of the microlenses, which are formed by permanent pressing of the plate against the pitted surface. The present invention also pertains to a device for implementing this process.

At the present time, networks of optical microlenses are used in various applications and, especially, for taking and reproducing images. In this technical field, we know of video image projectors that function by projecting light across a two-dimensional matrix of liquid crystal cells showing the image to be projected. These image projectors have a low luminous yield due to various levels of light absorption by polarizers placed on both sides of the matrix, by opaque margins of the cells of the matrix, by the projection screen, etc. For this reason, it is possible to improve the present luminous yield (on the order of 1%) by a factor of 2 or 3 by focusing the light source on the useful areas of the liquid crystal cells, which are selectively interchanged between an opaque state and a transparent state. Thus, we avoid absorption by the opaque margins of these cells. This absorption problem is also found in other devices, such as backlighted liquid crystal screens that are used in data processing for displaying information.

When one takes into account the dimensions of the matrices of liquid crystal cells in present use and the high definition now contemplated for video images intended for the general public, one must then arrange two-dimensional networks of microlenses distributed on the order of 100 $\mu$m. An example would be a network of lenses between several hundred thousand and several million.

From French Patent No. 9,408,420, filed on Jul. 7, 1994 by the applicant, we know that we can create such networks with a process of the type mentioned in the preamble of the present description. According to this process, a plate made of a malleable optical material is pressed against a nonmalleable pitted surface by subjecting the two sides of the plate to different pressures. The pressure on the side facing the pitted surface is less than the pressure established on the other side of this plate. The depth of the pits is greater than the thickness of the convex part of the microlenses formed by permanently bending the plate against the pitted surface. The absence of contact between the bottom of the pits and the convex parts of the microlenses preserves an "optical" finish for these parts.

In order to implement this process, the previously cited French patent application proposed a device containing a waterproof housing for fluid, a support means of optical material for the plate, and a rigid sheet with a pitted surface. They are parallel and close to each other. The plate thus constitutes an element of the housing's wall. This patent application also proposed a means for establishing different fluid pressure levels in the housing compared to that on the side of the plate opposite the plate limiting the housing, so that this plate is pressed against the pitted surface upon activation of the means used to establish pressure. In order to increase the productivity of this device, it can include a multiplicity of superposed housings. Each housing is limited by two optical plates on opposite sides and each is placed next to a corresponding pitted surface. The means for establishing fluid pressure in these housings operate in parallel.

By producing several networks of microlenses at the same time, we obtain the desired increase in productivity. Nevertheless, the device must also include a multiplicity of superposed housings having the appearance of a complex stacking of plates made of optical material, sheets with a pitted surface, supports, crossbars, and sealing gaskets. The assembling and disassembling of such a complex device limits the productivity of the described device.

The purpose of the present invention is to allow a process and a device for manufacturing networks of microlenses designed in order to ensure a high productivity, being suitable for industrial production in a large volume and at a low manufacturing cost.

Along with other aspects that will become known during the reading of the following description, the goal of the invention is reached by a process for manufacturing networks of microlenses of the type described in the preamble of the present description. It is remarkable in that one forms a group composed of a multiplicity of plates of malleable material and a multiplicity of generally flat molds in which each contains at least one nonmalleable pitted surface. These last objects are inserted between the plates so that at least one side of each of the plates is arranged opposite a pitted surface of a mold. A noticeably uniform pressure oriented perpendicularly to the surface of the plates is applied to the entire group, as it has been produced.

The group of plates and molds is quickly assembled and disassembled. It can even be done automatically. The setting of successive pressure for such groups of plates can also be automated, which allows reaching the desired high level of productivity.

Following another characteristic of the process according to the invention, one ensures isostatic pressing of the group of plates and molds, so as to produce networks of microlenses having uniform optical characteristics on the entire surface of the network.

Other characteristics and advantages of the process and device according to the invention will become known during the reading of the following description and the examination of the attached drawings in which:

FIG. 1 shows a schematic vertical sectional view of the device according to the invention, FIGS. 2 to 4 show a diagram illustrating various structures of the group of pressed plates and molds in the device of FIG. 1, FIG. 5 shows a diagram illustrating a process for marking two molds, in a group of plates and molds such as in FIG. 4, FIG. 6 shows a vertical cross-sectional view of the means for applying pressure which are part of the device in FIG. 1, and FIG. 7 shows a schematic view of the transfer means suitable for ensuring an automatic and continuous power supply for the device in FIG. 1, with the groups to be pressed.

We refer to FIG. 1 of the attached drawing in which it appears that the represented device includes a thermally insulated housing 1 of a refractory alloy, for example, Nicrimphy (trademark) of Imphy, Ltd., and means 2, which may be electric, for heating space 3 inside this housing 1. Housing 1 may be insulated by blankets 4 of thermal insulating fibrous material. Space 3 is closed by an insulating obturator 5 and a sliding door 6 installed on grooves 7.

Horizontal rails 8 are installed in space 3 to receive groups $9_1$, $9_2$, ... of plates of malleable optical material and flat molds inserted between these plates. As we will see later on, this will allow the transfer of these groups into pressing post 10, then the extraction of this post. These rails are solidly joined together across blanket 4 of frame 11 of the support for the device.

Gate 6 is crossed by control rod 12, which can slide horizontally into this gate. The rod successively allows moving and indexing the different groups $9_1$ to $9_3$ into positions for heating, pressing, and cooling.

There are means (not represented) that allow maintaining an inert nitrogen atmosphere in space 10, as is well known in ovens for thermal treatment.

Pressing post 10 includes a baseplate 13 and a die 14, represented in greater detail in FIG. 6. Die 14 is installed on a vertical shaft of support 15 by means of joint 16 whose axis is perpendicular to that of shaft 15, for a reason that will be explained later. Die 14 has two protrusions $14_1$, $14_2$ arranged to come into contact with corresponding support areas $17_1$, $17_2$ of group $9_i$ (i=1 to 3 in the example illustrated in FIG. 1) arranged in pressing post 10.

Baseplate 13 is installed vertically mobile on shaft 18 and forms a joint with an extremity of lever 19 (see FIG. 1), which is activated by jack 20 to revolve about axis 21 so as to bring baseplate 13 close to die 14, then to successively move it away during the pressing of group $9_i$ in post 10.

We now refer to FIG. 2 to describe the composition of such a group that includes, between two thick parallelepiped metallic blocks 22 and 23 that respectively constitute a counterbaseplate and a counterdie, a stack of glass plates or sheets $24_i$ inserted between metallic sheets $25_i$, which have a grooved side consisting of a regular network of pits. Each of the sheets $25_i$ constitutes a generally flat mold.

The group is completed by sheet 26 made of compressible material that is a good conductor of heat, such as graphite, placed against one of the blocks 22, 23 (here block 22) for a purpose that will be explained later. Sheet 26 is separated from the adjacent glass plate of the group by an inserted sheet 27 whose function will be described later.

The composition and production of glass plates $24_i$ and molds $25_i$ may correspond exactly to the description in the previously cited French patent application and in French Patent Application No. 9,502,983, which was filed on Mar. 15, 1995 by the applicant. One can refer to these applications for more details about these points. This is how we can use the glass with the reference number 7059 in the catalogs of Corning Incorporated to create plates $24_i$, which can be of different shapes, for example, 9×12 cm, and their thickness can be selected from a large range from 0.2 mm to 5 mm. In the present invention, we generally prefer using glass at a high softening temperature (for example, greater than 630° C.) and with a low hammering by compaction during thermal cycles that intervene in the processes of creating liquid crystal displays.

Molds $25_i$ can be made, for example, with the previously cited Nicrimphy 600 metal alloy sheet, whose thickness is, for example, between 0.2 and 0.3 mm. It is not malleable under the temperature (up to 750° C.) and pressure conditions of the process according to the invention. Nevertheless, the slight thickness of the molds advantageously contributes to the transmission of a pressure field without disturbing this field, as will be seen later.

The engraving of the pits is ensured by photolithographic techniques described in the previously cited patent applications. The depth of the printing is, of course, greater than the thickness of the convex part of the lenses to be formed by pressing in the glass plate so as to give an optical finish to the convex surface of the lenses, as it will be more thoroughly explained in said patent application.

Advantageously, molds $25_i$ are covered with an adhesive agent, such as boron nitride or soot, in order to avoid physico-chemical interactions between the plates and the molds, such as gluing during the pressing operation of group $9_i$.

The pressing gears, baseplate 13, die 14, counterbaseplate 22, and counterdie 23 must obviously maintain sufficient mechanical properties at the high temperatures (approximately 750° C.) established in space 3 in order to bring the glass plates to a plastic state suitable for the passage of these plates. Refractory steel of the NS 30 type (AFNOR Z12CN25-20) is suitable under these conditions, to create pressing gears.

Following an advantageous characteristic of the present invention, sheet 26, due to its compressibility, is used to absorb surface irregularities of counterbaseplate 22 so as to suppress any area of concentration of constraints during pressing, while thus ensuring excellent uniformity of the pressure established in the glass plates of group $9_i$, with this uniformity along with the temperature of the glass depending on the consistency of the optical characteristics of the microlenses formed on the entire surface of each plate. For this purpose, sheet 26 can be composed of a graphite sheet whose thickness is 0.8 mm. It is marketed under the name Sigraflex V 10010C4 by SGL Carbon GmbH. Its good thermal conductivity allows the metallic mass constituting counterbaseplate 22 to play an important role in standardizing the glass temperature, throughout the entire thickness of the group.

Inserted sheet 27 may be composed of an unengraved Nicrimphy 600 sheet, possibly covered by an adhesive agent, such as one of those mentioned above. It prevents the graphite sheet from reacting on the adjacent glass plate $24_i$.

The process for manufacturing networks of microlenses according to the invention, done with the help of the device in FIG. 1 and groups like those represented in FIG. 2, operates in the following manner.

After having introduced one or several groups $9_i$ into space 3, the first group ($9_i$) is pushed between baseplate 13 and die 14 of pressing post 10 with the help of control rod 12. The means for electrical heating are activated to control the operation of a thermal cycle in the oven so as to cause the ambient temperature of the glass plates to reach a temperature of approximately 750° C., with perhaps an intermediate level of 450° C. When the glass is stabilized at the temperature of 750° C., jack 20 is activated so as to develop several tons of pressure on the group, for approximately several tens of seconds. The jack is then released, which allows group $9_1$ to leave the pressing post 10 and also allows the introduction of group $9_2$, by pushing these groups with the help of rod 12. The pressing operations described above are repeated on this group and on the next one ($9_3$). Groups treated in this way are then brought back to the ambient temperature in the oven and are disassembled in order to take out glass plates $24_1$ which then support the networks of microlenses formed "without contact" during pressing operations, as it was described in the previously cited French Patent Application No. 9,408,420.

The geometry and thus the optical characteristics of the microlenses formed in this way are perfectly consistent on the entire surface of the networks because the device's characteristics according to the invention ensure isostatic pressing of the glass plates. On the one hand, this isostatic pressing is obtained by the presence of graphite sheet 13 for the reasons mentioned above, and, on the other hand, by the joint assembly of die 14 on its support 15. These two devices ensure a uniform distribution of the pressure developed by jack 20, in the entire volume of the pressed group. Moreover, the weak thickness of the molding sheets gives them a weak inertia, which does not disturb the transmission of a given pressure field across these sheets. Nicrimphy's excellent mechanical characteristics when hot, however, ensures local nonmalleability of the pits and their relative positioning.

Of course, the die's joint on its support 15 could be replaced by that of baseplate 13 on shaft 18.

Incidentally, it has been observed that, during pressing, baseplate 13 raises group $9_i$ above its support rails 8 so that these rails are insulated from the conditions developed by jack 20.

Groups of glass sheets and molds arranged differently from those represented in FIG. 2 could be pressed in the device according to the invention. Other possible stackings are represented in FIGS. 3 and 4. In FIG. 3, the stacking includes four plates $24_i$ and two molding sheets $25'_1$ and $25'_2$. Each of these sheets is engraved on its two sides with a network of pits. Molds $25'_1$ and $25'_2$ are placed between plates $24_1$ and $24_2$ and plates $24_3$ and $24_4$, respectively. Inserted sheet 27 separates plates $24_2$ and $24_3$ and another inserted sheet is joined to each of the two extremity sides of the enclosed group, as shown in FIG. 2, between a counterbaseplate and a counterdie (not represented). It is clear that this arrangement allows the production of as many networks of microlenses as in FIG. 2, with two molding sheets instead of four.

In FIG. 4, the group includes four glass plates $24_i$ and five molds $25_1$ to $25_5$; each is engraved on only one side. Plate $24_1$, is enclosed between two molds $25_1$ and $25_2$ that form, after pressing, a network of convex lenses on each of the two sides of plate $24_1$. The other plates $24_2$ to $24_4$ have only one network of microlenses, like that of the group shown in FIGS. 2 and 3.

We understand that the arrangement in FIG. 4 allows forming a network of biconvex microlenses with each network having a stronger convergence than a flat-convex lens, which is interesting in certain applications. Still, it is necessary that the microlenses of one of the networks supported by plate $24_1$, be perfectly centered on one of the lenses of the other network. To do this, two molds $25_1$ and $25_2$ must be arranged in relation to each other according to markings, obtained schematically, for example, in FIG. 5. The placement of circular hole 28 and buttonhole 29 is then simultaneously engraved on each mold. The drilling of these holes is completed by self-centered micromilling. Perfectly adjusted (±5 $\mu$m) pins 30 and 31 keep the two networks of pits in the marked positions, on both sides of plate $24_1$, during the pressing of the networks against this plate.

As a variant, this marking could be established during micromilling by small balls (not represented) placed between the two networks of pits. Centering is obtained by placing each ball in two pits facing each other, which are thus perfectly centered on each other.

It now seems that the invention allows ensuring the production of networks of microlenses in large volume, by the simultaneous pressing of several networks. The manufacturing costs remain low because the molds used can be manufactured by photolithography, a mass manufacturing process that has now been perfectly mastered. Pressing in an uncontrolled atmosphere is possible given the excellent resistance to oxidation, up to 850° C., of the material used to make the molds, for example Nicrimphy 600. The longevity of the molds is, nevertheless, increased by establishing in space 3 an inert nitrogen atmosphere by a classic means (not represented).

Isostatic pressing in accordance with the invention ensures the production of networks of microlenses having uniform optical characteristics on their entire surface. This pressing preferably takes place at a strong glass viscosity in order to guarantee the respect of dimensional tolerance, that is to say a viscosity of approximately $10^{10}$ poise, for 1–2 min, with a pressure of 20 to 50 bar, depending on the desired type of microlenses. The thermal cycle undergone by the glass in space 3 ensures tempering of the glass, which guarantees hammering by homogenous compaction during the cooling of this glass. The cooling ramp can be advantageously slow and be controlled to ensure a dimensional reproducibility of the microlenses greater than ±5 $\mu$m per 100 mm. A controlled modification of this cooling ramp allows fine dimensional adjusting, without deterioration of either the optical characteristics of the lenses or the surface state of the network.

The process according to the invention lends itself to automation in the manufacturing of networks, which increases even more the productivity of the device according to the invention. For this reason, in FIG. 7 we have schematically represented an embodiment of the device according to the invention, equipped with transfer means that ensure an automatic and continuous passage of groups $9_i$ into this device. This device includes tunnel 32 crossed by conveyor 33 of groups $9_i$, for example, with a gas cushion. This conveyor receives preformed groups $9_i$ from charging terminal 34. The groups move on the conveyor until pressing post 10 and are removed into draining terminal 35. Heating means $2_j$, which are distributed along the length of the tunnel, establish the thermal cycle mentioned earlier. Means for handling flat products (not represented) of various types well known in the industry may ensure the automatic production of groups and the automatic extraction of networks of microlenses outside of the groups coming from the device according to the invention.

Of course, the invention is not limited to the described and represented embodiment, which was given only as an illustrative example. It is thus that the invention can find applications for manufacturing networks of microlenses by focusing acoustic rather than optical waves, in particular ultrasound waves. The invention also extends to the pressing of networks of microlenses with contact between the bottom of the pits of the molds and plates made of malleable material. This material thus fills the pits, which is not the case with the process cited as a reference in the preamble of the present description, and described more completely in the two previously cited French Patent Application Nos. 9,408,420 and 9,502,983. The device according to the invention must then be equipped with a means for establishing a vacuum pushed into space 3, to prevent gas bubbles from stopping the malleable material from completely filling the pits of a mold.

What is claimed is:

1. Process for producing an array of microlenses on a plate of a malleable material in which the plate is pressed against a nonmalleable surface having an array of pits in which at least the surface opening of the pits correspond to the base contours of convex microlenses to be formed therein by pressing the plate against the pitted, nonmalleable surface, the process comprising providing a plurality of plates and a plurality of flat molds, each of the molds having at least one nonmalleable, pitted surface, assembling the molds between the plates to form a stack in which at least one side of each plate faces a pitted surface of a mold, and applying to the assembly a uniform pressure oriented perpendicularly to the surface of the plates.

2. Process according to claim 1, which ensures uniform pressing of the group of plates and molds.

3. Process in accordance with claim 1, which comprises providing in the stack at least one mold engraved with an array of pits on each of its two sides and placing the at least one mold between two plates made of a malleable optical material.

4. Process in accordance to claim 1 which comprises placing at least one plate in a stack between two pitted surfaces of two different molds so that these two surfaces correspond, arranging them for marking to ensure pressing an array of biconvex microlenses on said one plate.

5. Process in accordance with claim 1 which comprises applying sufficient pressure to the group to cause the formation of convex surfaces of microlenses on the sides of the plates, which are facing said pitted surfaces of the molds, without contact of said convex surfaces with the surfaces of the pits.

6. Device for producing an array of microlenses on a plate of a malleable material, the device including a thermally insulated housing, a means for heating the space inside this housing, a means for supporting, in the housing, at least one group composed of a plurality of plates of malleable optical material under pressure at a temperature established by the heating means; the group including a plurality of generally flat molds with each mold including at least one nonmalleable pitted surface under pressure at said temperature, with the molds being inserted between the plates so that at least one side of each of the plates faces the pitted surface of a mold, and a means for applying a uniform pressure, oriented perpendicularly to the surface of the plates, to the entire group, as it is thus composed.

7. Device according to claim 6 wherein the molds are of sufficiently low thickness so as not to interfere with the transmission of a pressure field and the material constituting the molds being thermally stable so that local nonmalleability of the pits and their relative positioning remains unchanged.

8. Device according to claim 6 wherein said means of applying pressure includes a baseplate and a die adapted to receive between them a group of plates and molds, a power unit to bring the baseplate and die toward each other when said group is installed between them, and a means for ensuring the setting of the group under uniform pressure.

9. Device according to claim 8, wherein said means for placing the group under uniform pressure include a sheet of a compressible material, placed between either the die or the baseplate and the group.

10. Device according to claim 9, wherein the sheet of compressible material is composed of graphite.

11. Device according to claim 8 wherein said means for placing under uniform pressure includes connection means of the die or the baseplate around an axis perpendicular to the direction in which the pressure is applied.

12. Device according to claim 6 which includes a conveyor of plates to automatically move the groups into and out of pressing post 10.

13. Device according to claim 12 which includes a means for the automatic production of groups and a means for the automatic extraction of arrays of pits formed after pressing.

14. Device in accordance with claim 6 which includes means for applying a pressure that causes the production of convex surfaces of microlenses on the sides of the plates facing said pitted surfaces of the molds without contact of said convex surfaces with the surfaces of the pits.

15. Device according to claim 6 which includes a means for establishing a vacuum in space 3 and a means for applying sufficient pressure to the plates to completely fill the pits of the molds with the material of these plates.

16. Device according to claim 6 for carrying out the method of claim 3, wherein intermediate sheets are inserted in the group of plates to prevent adhering the adjacent two plates to one another.

17. Array of micorlenses produced by the process of claim 1.

* * * * *